United States Patent
Pierce et al.

(10) Patent No.: US 12,462,060 B2
(45) Date of Patent: Nov. 4, 2025

(54) OBFUSCATING INFORMATION IN CONTENT PRESENTED ON A DISPLAY

(71) Applicant: Capital One Services, LLC, McLean, VA (US)

(72) Inventors: Brandee Pierce, South Pasadena, CA (US); Kristina Holly Sisk, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 457 days.

(21) Appl. No.: 17/807,239

(22) Filed: Jun. 16, 2022

(65) Prior Publication Data

US 2023/0409747 A1   Dec. 21, 2023

(51) Int. Cl.
*G06F 21/14* (2013.01)
*G06F 21/62* (2013.01)

(52) U.S. Cl.
CPC .......... *G06F 21/6254* (2013.01); *G06F 21/14* (2013.01)

(58) Field of Classification Search
CPC ....... G06F 21/6254; G06F 21/14; G06F 21/84
See application file for complete search history.

(56) References Cited

U.S. PATENT DOCUMENTS

| | | | | |
|---|---|---|---|---|
| 5,838,832 A | * | 11/1998 | Barnsley | G06T 9/001 375/E7.204 |
| 11,422,835 B1 | * | 8/2022 | Ramanathan | G06F 9/451 |
| 2013/0235171 A1 | * | 9/2013 | Takeshita | H04N 13/341 348/56 |
| 2016/0188973 A1 | * | 6/2016 | Ziaja | G06F 21/84 382/116 |
| 2019/0214060 A1 | * | 7/2019 | Goel | H04W 12/61 |
| 2021/0073320 A1 | * | 3/2021 | Ocondi | G06F 7/544 |
| 2021/0350033 A1 | * | 11/2021 | Kapinos | H04M 1/72457 |
| 2021/0374275 A1 | * | 12/2021 | Singh | G06F 16/538 |
| 2023/0376626 A1 | * | 11/2023 | Haerterich | G06F 21/6254 |

* cited by examiner

*Primary Examiner* — Lynn D Feild
*Assistant Examiner* — Vladimir I Gavrilenko
(74) *Attorney, Agent, or Firm* — Harrity & Harrity, LLP

(57) ABSTRACT

In some implementations, a device may obtain content data that indicates content that is to be presented on a display, where the content data is in a binary format. The device may process the content data, in connection with rendering the content for presentation on the display, to identify information in the content. The device may determine that the information is to be obfuscated in the content based on one or more characteristics of the information. The device may generate presentation data, for presenting the content on the display, to obfuscate the information by altering a portion of the presentation data that is associated with the information. The device may provide the presentation data to the display to cause presentation of the content with the information obfuscated.

20 Claims, 8 Drawing Sheets

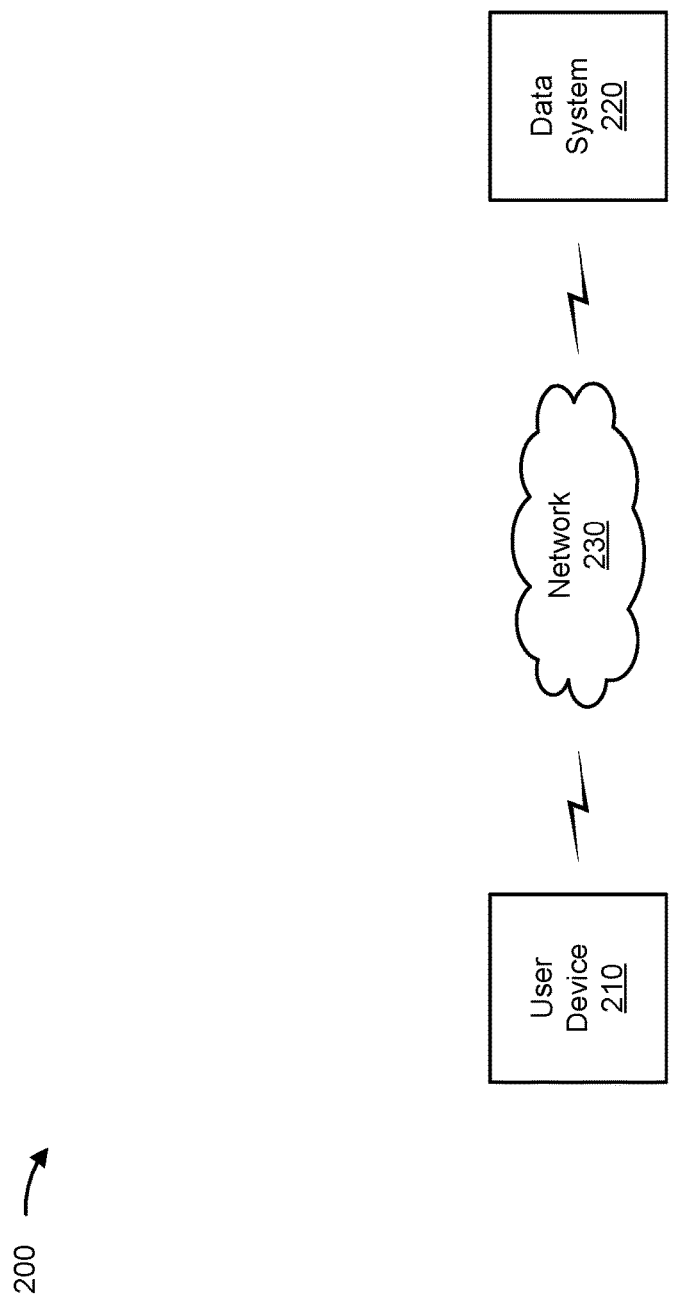

OBFUSCATING INFORMATION IN CONTENT PRESENTED ON A DISPLAY

BACKGROUND

Data masking or data obfuscation is the process of hiding original data with modified content, such as symbols, characters, and/or other data. Data masking may be used to protect data that is personally identifiable information, sensitive personal data, and/or commercially sensitive data, among other examples. Data masking may modify the original data (e.g., to protect or hide sensitive data) while maintaining a format or appearance of the data.

SUMMARY

Some implementations described herein relate to a system for obfuscating information in content presented on a display. The system may include one or more memories and one or more processors communicatively coupled to the one or more memories. The system may be configured to obtain content data that indicates content that is to be presented on a display, where the content data is in a binary format. The system may be configured to process the content data, in connection with rendering the content for presentation on the display, to identify information in the content. The system may be configured to determine that the information is to be obfuscated in the content based on one or more characteristics of the information. The system may be configured to generate first presentation data, for presenting the content on the display, to obfuscate the information by altering a portion of the first presentation data that is associated with the information. The system may be configured to provide the first presentation data to the display to cause presentation of the content with the information obfuscated. The system may be configured to obtain an indication that the information is to be revealed. The system may be configured to generate, based on the indication, second presentation data, for presenting the content on the display, to reveal the information, where the portion of the first presentation data that is altered to obfuscate the information is unaltered in the second presentation data to reveal the information. The system may be configured to provide the second presentation data to the display to cause presentation of the content with the information revealed.

Some implementations described herein relate to a method of obfuscating information in content presented on a display. The method may include obtaining, by a device, content data that indicates content that is to be presented on a display, where the content data is in a binary format. The method may include processing, by the device, the content data, in connection with rendering the content for presentation on the display, to identify information in the content. The method may include determining, by the device, that the information is to be obfuscated in the content based on one or more characteristics of the information. The method may include generating, by the device, presentation data, for presenting the content on the display, to obfuscate the information by altering a portion of the presentation data that is associated with the information. The method may include providing, by the device, the presentation data to the display to cause presentation of the content with the information obfuscated.

Some implementations described herein relate to a non-transitory computer-readable medium that stores a set of instructions for obfuscating information in content presented on a display for a device. The set of instructions, when executed by one or more processors of the device, may cause the device to obtain content data that indicates content that is to be presented on a display, where the content data is in a binary format. The set of instructions, when executed by one or more processors of the device, may cause the device to process the content data, in connection with rendering the content for presentation on the display, to identify information in the content. The set of instructions, when executed by one or more processors of the device, may cause the device to determine that the information is to be obfuscated in the content. The set of instructions, when executed by one or more processors of the device, may cause the device to generate presentation data, for presenting the content on the display, to obfuscate the information. The set of instructions, when executed by one or more processors of the device, may cause the device to provide the presentation data to the display to cause presentation of the content with the information obfuscated.

BRIEF DESCRIPTION OF THE DRAWINGS

FIG. 2 is a diagram of an example environment in which systems and/or methods described herein may be implemented, in accordance with some embodiments of the present disclosure.

DETAILED DESCRIPTION

Figure 1A:
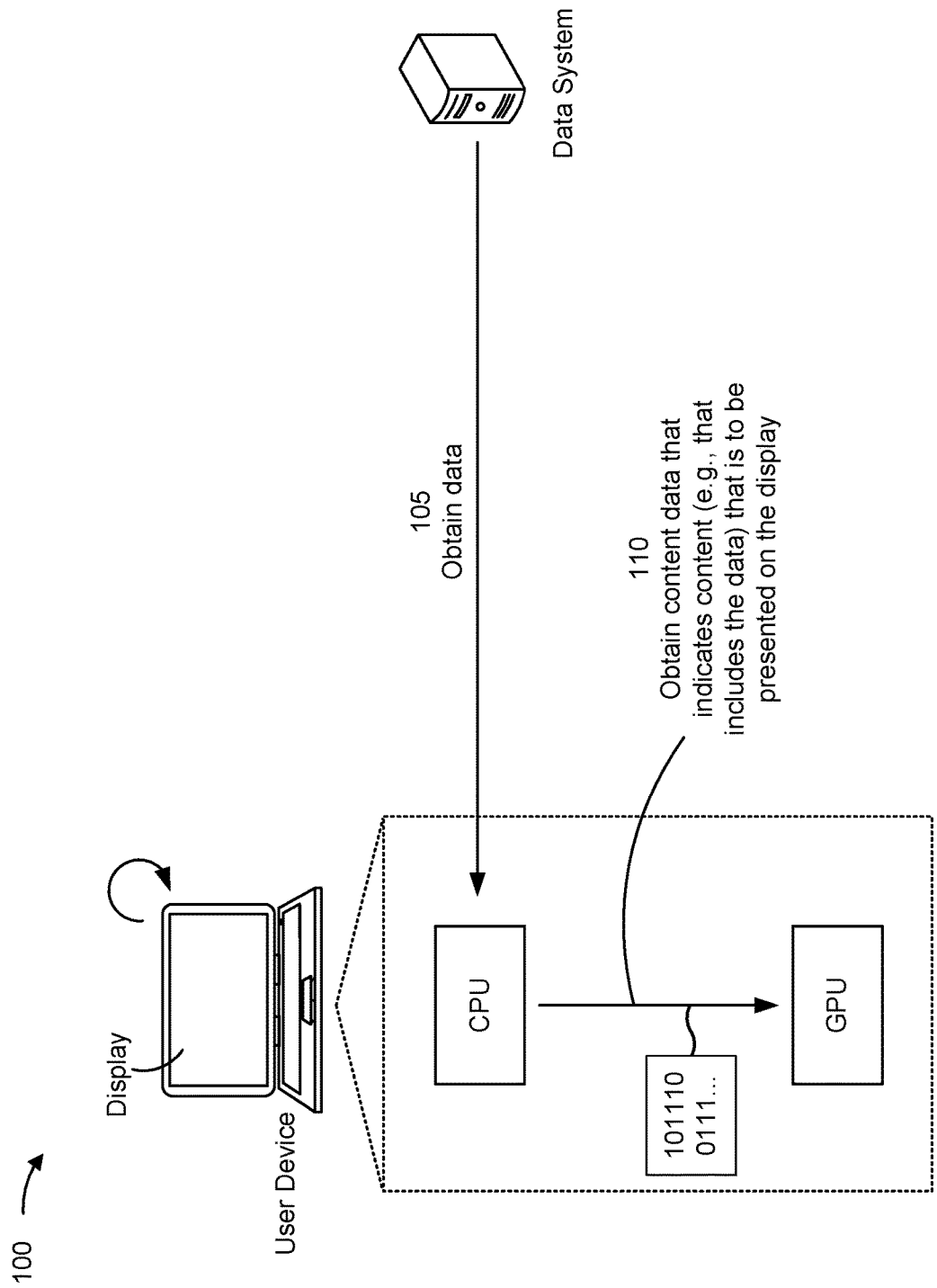
FIGS. 1A-1E are diagrams of an example implementation relating to obfuscating information in content presented on a display, in accordance with some embodiments of the present disclosure.

The following detailed description of example implementations refers to the accompanying drawings. The same reference numbers in different drawings may identify the same or similar elements.

In some cases, a user may access and/or utilize an application or system to present sensitive information on a display. Sensitive information may include personal information (e.g., identification information and/or contact information), confidential information (e.g., information relating to an entity's internal projects or customers), security-related information (e.g., authentication information), or other types of non-public information. Such information is commonly a target of data exfiltration or other data theft.

An entity may utilize various security measures to secure sensitive information and prevent data exfiltration. Generally, these security measures are implemented at a data layer (e.g., using encryption) and/or at an application layer (e.g., using native application controls or a cloud access security broker (CASB)) of a device. However, such data layer and/or application layer security measures may be easily circumvented. Moreover, once sensitive information is presented on a display, such security measures may not prevent unauthorized copying of the sensitive information by a screen capture (e.g., a screenshot or a screen recording) or by a photograph of the display. Thus, sensitive information within the screen capture or the photograph can be used to commit fraud or another type of malicious activity. As a result, the entity may expend substantial computing resources toward securing sensitive information, monitoring for and detecting data exfiltration, and/or remediating fraud or other malicious activity that is committed using exfiltrated data, among other examples.

Some implementations described herein provide security for sensitive information at a hardware layer of a device. In some implementations, a device (e.g., using a graphics processing unit (GPU)) may obtain content data that indicates content that is to be presented on a display, and the content data may be in a binary format. Thus, text (e.g., letters, numbers, and/or other characters) in the content may be associated with binary patterns in the content data that are knowable and predictable from a display rendering standpoint regardless of an application of the device that produced the content and/or regardless of a particular hardware configuration of the device. Accordingly, the device (e.g., using the GPU) may process the content data to identify text of the content based on such patterns. Based on the identified text, the device (e.g., using the GPU) may identify information in the content that should be obfuscated. The device (e.g., using the GPU) may generate presentation data (e.g., indicating values for pixels of the display) for presenting the content on the display in a manner that obfuscates the information. For example, the device may generate the presentation data so as to alter a portion of the presentation data associated with the information (e.g., by replacing, omitting, or scrambling the portion of the presentation data). Accordingly, the device (e.g., using the GPU) may provide the generated presentation data to the display to cause presentation of the content with the information obfuscated. Responsive to a user interaction with the device indicating that the information is to be revealed, the device (e.g., using the GPU) may generate, and provide to the display, different presentation data that causes presentation of the content with the information revealed.

In this way, techniques described herein provide improved computer security and reduce data exfiltration. In particular, implementation at the hardware layer of the device enables techniques described herein to be used across applications and hardware configurations as well as used in mobile devices and virtual environments. For example, in contrast to obfuscation mechanisms implemented at an application layer, which may be inconsistent with one another or lacking altogether, text identification based on processing at the GPU facilitates consistent and comprehensive text obfuscation across applications. Moreover, processing by the GPU occurs immediately before content is output to display hardware, thereby making the obfuscation more difficult to circumvent (e.g., relative to application layer or operating system layer obfuscation or other central processing unit (CPU)-based obfuscation). Furthermore, implementation at the GPU of techniques described herein facilitates text identification and obfuscation across devices without the need for additional software or device configuration.

In addition, because obfuscated information may be revealed only after a user interaction, techniques described herein facilitate the detection of user behavior indicative of data exfiltration by screen capture or photograph, thereby reducing fraud or other malicious activity. Accordingly, computing resources that would otherwise be used toward securing sensitive information, monitoring for and detecting data exfiltration, and/or remediating fraud or other malicious activity that is committed using exfiltrated data, among other examples, may be conserved.

FIGS. 1A-1E are diagrams of an example 100 associated with obfuscating information in content presented on a display. As shown in FIGS. 1A-1E, example 100 includes a user device and a data system. These devices are described in more detail in connection with FIGS. 2 and 3. In some implementations, the user device may include at least one GPU and/or at least one CPU that are configured to perform the techniques described herein. For example, software and/or firmware implemented by the GPU may be executed by the GPU to cause the GPU to perform the techniques described herein. In some implementations, techniques described herein may be performed using an application-specific integrated circuit (ASIC), a system on a chip (SoC), or the like. In some implementations, the user device (e.g., the GPU) may be configured with information that enables identification of text (e.g., letters, numbers, and/or punctuation) from binary data. For example, the information may identify binary patterns associated with various text. In some implementations, the user device (e.g., the GPU) may be configured with a machine learning model that is trained to identify text from binary data (e.g., by supervised learning using training data that includes binary data and information indicating the corresponding text rendered on a display).

As shown in FIG. 1A, and by reference number 105, the user device may obtain data from the data system. For example, an application executing on the user device may cause the user device to obtain the information for presentation on a display. As described herein, the information may include sensitive information. The user device may generate content data that indicates a user interface (e.g., a graphical user interface), that includes the information or derivations thereof, for presentation on the display. For example, the CPU of the user device may generate the content data.

As shown by reference number 110, the user device may obtain the content data (e.g., based on generating the content data) that indicates content that is to be presented on the display. The content data may be in a binary format. The content may include any textual, graphical, and/or video content that can be presented on the display in a visually perceptible manner. For example, the content may include a document (e.g., a word processing document, a spreadsheet, or a presentation document, among other examples), a webpage, an image, a video, a game, a user interface (e.g., of an operating system), and/or a user interface element (e.g., a button, a menu, a tab, or a text entry box), among other examples.

Figure 1B:
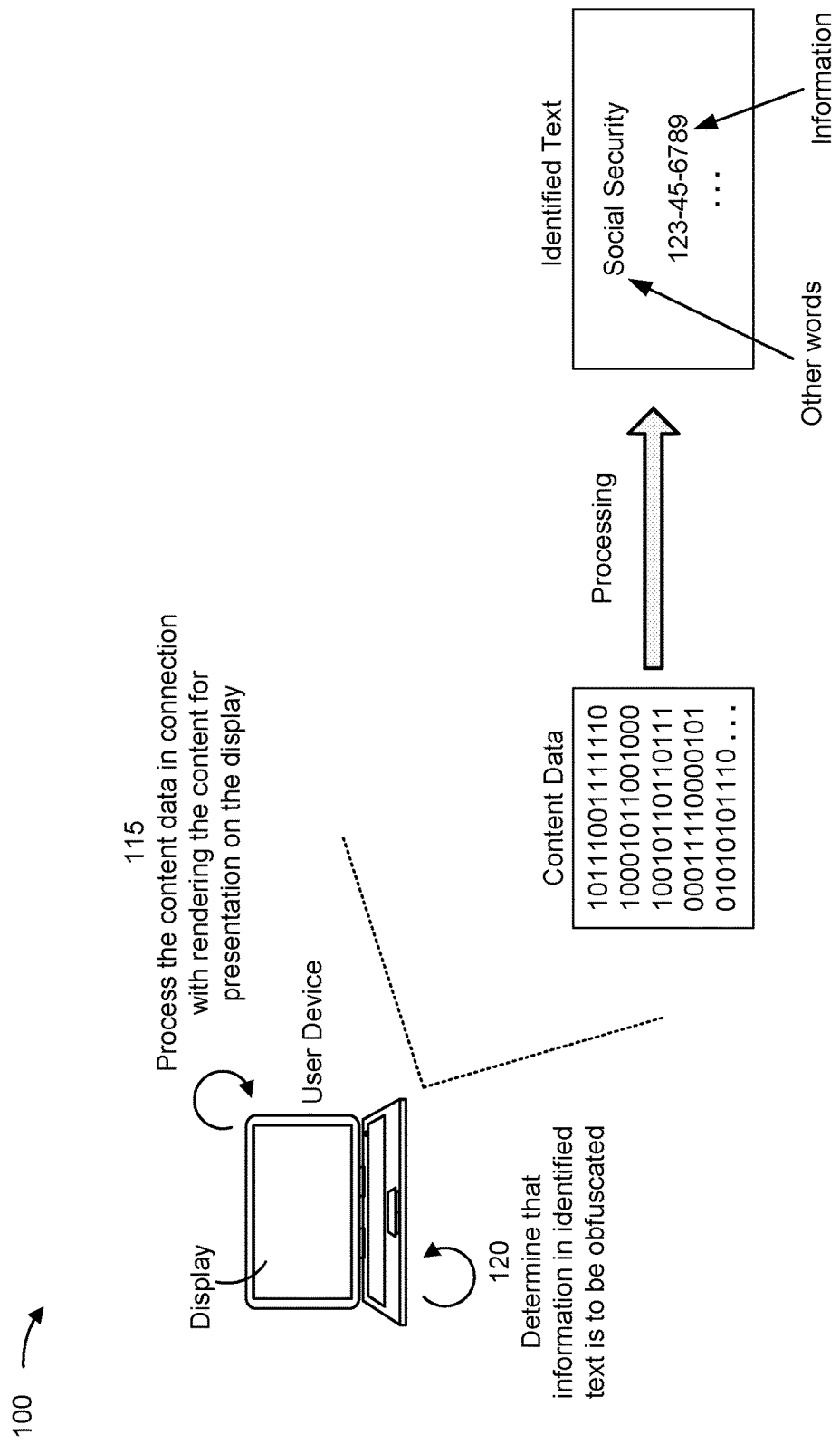

As shown in FIG. 1B, and by reference number 115, the user device (e.g., using the GPU) may process the content data in connection with rendering the content (e.g., one or more frames of the content) for presentation on the display. For example, processing the content data may include performing rasterization using the content data. In some implementations, the content data is processed based on a resolution of the display, an aspect ratio of the display, or the like.

In some implementations, the GPU of the user device may obtain the content data (e.g., a signal indicating the content data) from the CPU of the user device. For example, the user device may use a graphics application programming interface (API) driver to provide the content data to the GPU. The GPU may process the content data to translate the content data into an output for display hardware (e.g., a monitor) that is to be sent over an output interface (e.g., a high-definition multimedia interface (EIDMI), a universal serial bus (USB)-C interface, or the like). Techniques described herein relating to text identification and obfuscation may be performed by the GPU in connection with processing the content data to translate the content data into the output.

The user device may process the content data to identify text (e.g., letters, numbers, and/or punctuation) in the content. That is, as the user device processes the content data in connection with rendering the content, the user device may identify text in the content. The user device, to identify the text, may use the information that identifies binary patterns associated with various text, as described above. In some implementations, the user device, to identify the text, may use the machine learning model trained to identify text from data in a binary format. In some implementations, as the user device processes the content data in connection with rendering the content, the user device may determine pixel locations and values that are to be used for presenting the content on the display, and the user device may identify the text based on the pixel locations and values (e.g., using the information that identifies binary patterns associated with various text and/or the machine learning model).

In other words, in contrast to identifying text based on binary-encoded text characters (e.g., using ASCII encoding), such as for an application, the user device may identify characters based on data that identifies pixel locations and values for outputting to display hardware. For example, data indicating that black color is assigned to a group of pixels, spanning multiple consecutive columns and a greater quantity of multiple consecutive rows (e.g., forming a vertical column), that is surrounded by pixels assigned white color may indicate the letter "I." Other patterns may indicate other text characters in a similar manner. In some implementations, the information identifying the binary patterns may identify templates for various text characters (e.g., a template for the letter "I" may be as described above), and to identify text, the user device may compare the data to the templates (e.g., by computing an amount by which the data matches or differs from a template).

The identified text may include information of interest as well as one or more other words, numbers, and/or punctuation. For example, if the content is a graphical user interface associated with a web browser application, then the identified text may include text for menus of the web browser application, text in an address bar of the web browser application (e.g., a web page address), and text of a web page displayed by the web browser application (e.g., which may include both sensitive information and non-sensitive information). The information may include sensitive information, confidential information, personally identifiable information, or other private information, such as a social security number, a bank account number, a credit card number, a passport number, a driver's license number, a password, accounting data, and/or medical information, among other examples.

As shown by reference number 120, based on processing the content data, the user device (e.g., using the GPU) may determine that the information in the identified text is to be obfuscated (e.g., concealed, masked, or the like). The user device may determine that the information in the identified text is to be obfuscated based on one or more characteristics of the information. In some implementations, the one or more characteristics may include a type of the information (e.g., letters only, numbers only, a combination of letters and numbers, a combination of numbers and punctuation, or the like), a length of the information (e.g., a length of a string of letters or a sequence of numbers), and/or a formatting of the information (e.g., a particular location of letters, numbers, and/or punctuation in the information). For example, if the information includes a 16-digit sequence of numbers in a format "9999 9999 9999 9999," then the user device may determine that the information should be obfuscated (e.g., because the length and the formatting of the information resembles a credit card number). As another example, if the information includes a 9-digit sequence of numbers in a format "999-99-9999," then the user device may determine that the information should be obfuscated (e.g., because the length and the formatting of the information resembles a social security number). In some implementations, the user device may determine that the information in the identified text is to be obfuscated using one or more regular expressions (e.g., based on whether the information matches the one or more regular expressions). The one or more regular expressions may define data formats indicative of information that is to be concealed (e.g., a data format "9999 9999 9999 9999" or a data format "999-99-999," etc.).

Additionally, or alternatively, the user device may determine that the information in the identified text is to be obfuscated based on one or more words that are also in the identified text. For example, if the identified text includes the words "social security number" and the information is a 9-digit sequence of numbers, then the user device may determine that the information should be obfuscated. Here, the user device may determine that the information should be obfuscated further based on a relationship between the one or more words and the information, such as a distance between the one or more words and the information. Thus, the one or more characteristics used to determine that the information should be obfuscated may include one or more first characteristics (e.g., a numeric type of information, a length of 9 numbers, and a format of "999-99-9999") if the one or more words are one or more first words (e.g., "social security number"), and may include one or more second characteristics (e.g., a numeric type of information, a length of 16 numbers, and a format of "9999 9999 9999 9999") if the one or more words are one or more second words (e.g., "credit card number").

Additionally, or alternatively, the user device may determine a classification of the content based on the information and/or other text that is also in the identified text. For example, if the identified text includes the words "credit card number" and/or includes a webpage address associated with a financial institution's user accounts area (e.g., financial-institution.com/accounts), then the user device may determine that the content is credit card account information. The user device may determine whether the information should be obfuscated based on a classification of the content. For example, if the content is classified as credit card account information and the information is a 16-digit sequence of numbers, then the user device may determine that the information should be obfuscated (e.g., because credit card numbers are 16 digits). However, if the content is classified as credit card account information and the information is a 9-digit sequence of numbers, then the user device may determine that the information should not be obfuscated (e.g., because the 9-digit sequence of numbers is not likely to be a social security number because social security numbers are not commonly shown with credit card account information). In other words, the one or more characteristics used to determine that the information should be obfuscated may be one or more first characteristics if the classification of the content is a first classification and may be one or more second characteristics if the classification of the content is a second classification. In this way, the user device may determine information that is to be obfuscated with high accuracy.

Additionally, or alternatively, the user device may determine that the information in the identified text is to be obfuscated based on data access permissions associated with the user device. For example, a first user device of an entity may have permission to access customer credit card data and a second user device of the entity may not have permission to access the customer credit card data. Accordingly, the first user device may determine that a 16-digit sequence of numbers should be obfuscated (e.g., because the first user device has access to customer credit card data), whereas the second user device may determine that a 16-digit sequence of numbers should not be obfuscated (e.g., because the second user device does not have access to customer credit card data).

In some implementations, the user device may use a machine learning model to determine whether the information in the identified text is to be obfuscated. For example, the machine learning model may be trained to output an indication of text that should be obfuscated based on an input of the content data and/or the identified text. In particular, the machine learning model may be trained by supervised learning using training data that includes sets of text and information indicating text, in a set of text, that should be obfuscated. In some implementations, the machine learning model may identify the text that is to be obfuscated based on a feature set that includes a type of text (e.g., word, number, etc.), a length of text, a formatting of text, and/or a proximity between (e.g., in number of words) multiple pieces of text, among other examples.

Figure 1C:
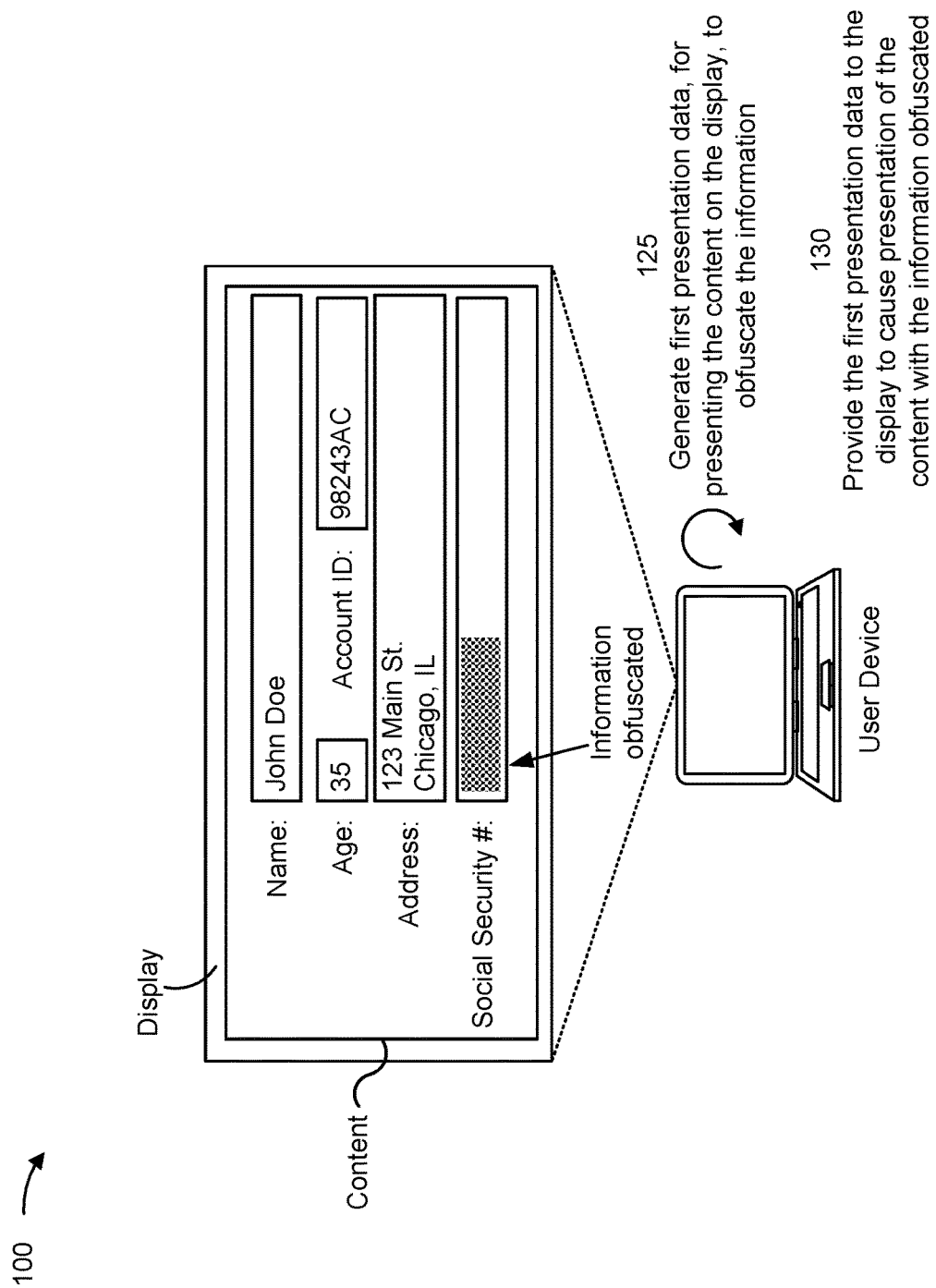

As shown in FIG. 1C, and by reference number 125, based on determining that the information is to be obfuscated, the user device (e.g., using the GPU) may generate first presentation data for presenting the content on the display. In other words, the user device (e.g., using the GPU) may render one or more frames of the content for presentation on the display, and the one or more frames may be indicated by the presentation data that is generated. Thus, the presentation data may indicate data to be transmitted over an output interface (e.g., an HDMI, a USB-C interface, or the like) to display hardware. For example, the presentation data may indicate values (e.g., color values) for pixels of the display.

The user device may generate the first presentation data to obfuscate the information. For example, the user device may generate the first presentation data to obfuscate the information by altering (e.g., proactively or retroactively) a portion of the first presentation data that is associated with the information. Altering the portion of the first presentation data may include replacing, omitting, and/or scrambling the portion of the first presentation data. To replace the portion, the user device may generate the first presentation data such that values (e.g., pixel color values) are assigned to pixels associated with the portion to produce different text (e.g., a string of asterisks) from the information. For example, when rendering the first presentation data, the GPU may render the portion to overwrite pixel values that produce the information with pixel values that produce the different text. In this way, the first presentation data may cause the display to present the different text in the content where the information would otherwise appear. To omit the portion, the user device may generate the first presentation data such that a single value (e.g., a single pixel color value, such as a value representing the color black) or random values (e.g., random pixel color values representing random colors, to thereby create random noise) are assigned to pixels associated with the portion. For example, when rendering the first presentation data, the GPU may render the portion to overwrite pixel values that produce the information with pixel values that produce a redaction block. In this way, the first presentation data may cause the display to present a redacted area or random noise in the content where the information would otherwise appear. To scramble the portion, the user device may generate the first presentation data such that values (e.g., pixel color values) are rearranged (e.g., randomly, pseudo-randomly, or according to a pattern) for pixels associated with the portion of the first presentation data. For example, when rendering the first presentation data, the GPU may render the portion to scramble pixel values that produce the information. In some implementations, to scramble the portion, the user device may apply a filter (e.g., a Gaussian blur filter, a noise filter, or the like) to the portion when generating the first presentation data. In this way, the first presentation data may cause the display to present blurry or illegible text where the information would otherwise appear.

In some implementations, the user device (e.g., the GPU) may store the information being obfuscated. The user device may store the information being obfuscated based on generating the first presentation data. The user device may store the information in one or more memories, or another storage location, of the user device (e.g., of the GPU).

As shown by reference number 130, the user device (e.g., using the GPU) may provide the first presentation data to the display to cause presentation of the content with the information obfuscated. For example, the user device may store the first presentation data in memory for retrieval (e.g., by a controller, the CPU, or the like) and transmission to the display. To provide the first presentation data to the display, the user device (e.g., the GPU) may transmit the first presentation data over an output interface (e.g., an EIDMI, a USB-C interface, or the like) to the display. The display may be a component of the user device, or the display may be separate from the user device and communicatively connected to the user device by a wired connection or a wireless connection.

Figure 1D:
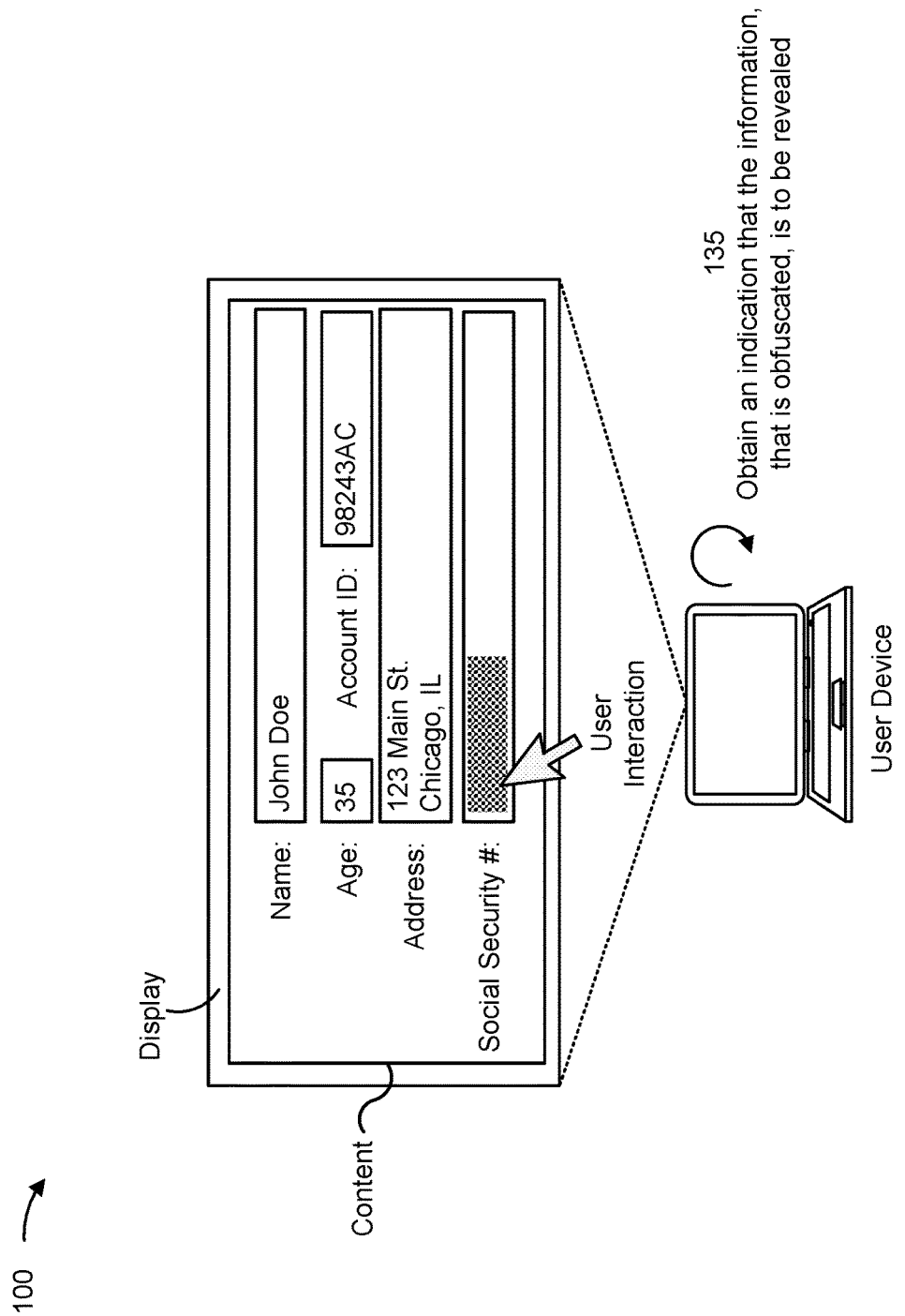

As shown in FIG. 1D, and by reference number 135, the user device may obtain an indication that the information, that is obfuscated, is to be revealed. The indication may be responsive to a user interaction with a portion of the content associated with the portion of the first presentation data. For example, the portion of the content may include the information that is obfuscated in a form field, a line of text, a cell in a spreadsheet, or the like. The user interaction may include a tap, or another touch gesture, on an area of the display associated with the portion of the content, a click on the portion of the content, a click on the portion of the content in combination with a keypress, or the like. In some examples, a first component of the user device (e.g., the CPU) may detect the user interaction with the portion of the content, and the first component may provide the indication to a second component of the user device (e.g., the GPU). In some other examples, a single component of the user device may detect the user interaction with the portion of the content and determine that the user interaction indicates that the information is to be revealed (e.g., based on one or more characteristics of the user interaction, such as a type of the user interaction (e.g., a tap, a click, a double-click, etc.) or a duration of the user interaction). In some implementations, where the information that is obfuscated is stored (e.g., in the memory), the user device (e.g., using the GPU) may obtain the information (e.g., from the memory) responsive to obtaining the indication that the information is to be revealed.

Figure 1E:
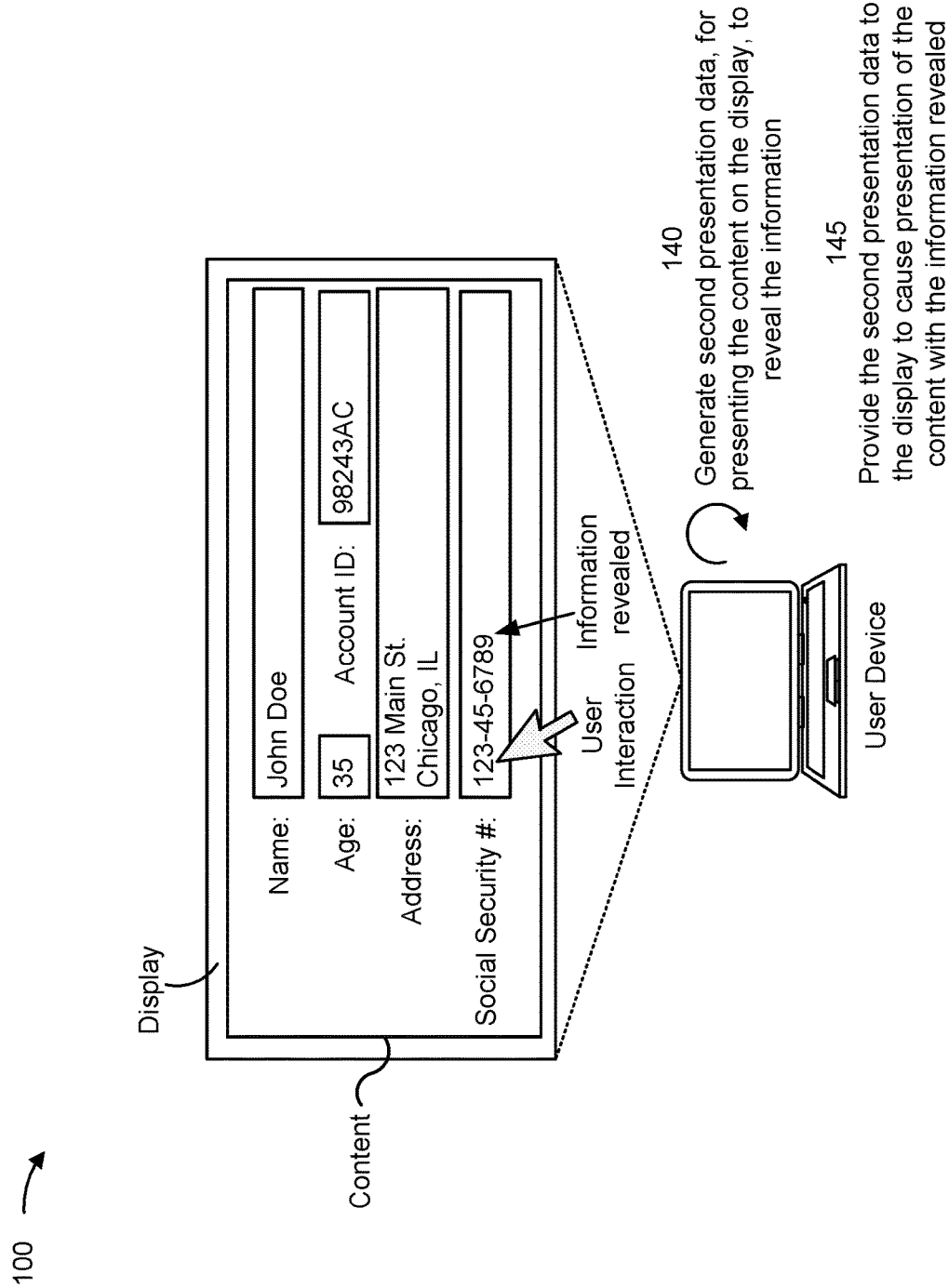

As shown in FIG. 1E, and by reference number 140, responsive to the user interaction (e.g., based on obtaining the indication that the information is to be revealed), the user device may generate (e.g., using the GPU) second presentation data for presenting the content on the display, in a similar manner as described above for the first presentation data. However, in contrast to the first presentation data, the user device may generate the second presentation data to reveal the information. For example, the portion of the first presentation data that is altered to obfuscate the information may be unaltered in the second presentation data (e.g., in a corresponding portion of the second presentation data) to reveal the information.

As shown by reference number 145, the user device (e.g., using the GPU) may provide the second presentation data to the display to cause presentation of the content with the information revealed. For example, the user device may store the second presentation data in memory for retrieval (e.g., by a controller, the CPU, or the like) and transmission to the display. To provide the second presentation data to the display, the user device (e.g., the GPU) may transmit the second presentation data over an output interface (e.g., an EIDMI, a USB-C interface, or the like) to the display. In some implementations, the user device (e.g., using the GPU) may provide the second presentation data to cause presentation of the content with the information revealed, or provide other presentation data that also causes presentation of the content with the information revealed, to the display while the user interaction is ongoing (e.g., while the user device detects that the user interaction is ongoing and/or obtains an indication that the user interaction is ongoing). That is, the information may remain revealed on the display so long as the user interaction (e.g., the tap, click, and/or keypress) is maintained. In some implementations, the user device (e.g., using the GPU) may provide the second presentation data to cause presentation of the content with the information revealed, or provide other presentation data that also causes presentation of the content with the information revealed, to the display until the user device obtains a different indication that different obfuscated information of the content is to be revealed. That is, only one piece of obfuscated information of the content may be revealed at a time.

In some implementations, the user device may monitor user interactions with the content that is presented on the display. For example, the user device may monitor the user interactions to identify behavior that is indicative of data exfiltration. In some implementations, the user device may monitor a quantity of screen captures of the content that is presented on the display, and the user device may determine that the quantity of screen captures satisfies a threshold. In some implementations, the user device may monitor a frequency at which obfuscated information is revealed (e.g., at which indications to reveal obfuscated information are obtained), and the user device may determine that the frequency satisfies a threshold. The quantity of screen captures satisfying a threshold and/or the frequency satisfying a threshold may indicate data exfiltration because, in some examples as described above, only one piece of obfuscated information of the content may be revealed at a time (and thus multiple screen captures would be needed to capture multiple pieces of obfuscated information of the content, and/or obfuscated information may be revealed in quick succession for taking the multiple screen captures or photographs of the display).

Based on identifying behavior that is indicative of data exfiltration (e.g., determining that the quantity of screen captures satisfies the threshold and/or the frequency at which obfuscated information is revealed satisfies the threshold), the user device may perform one or more actions for (e.g., to resolve or to mitigate) an occurrence of data exfiltration.

In some implementations, an action may include generating a record that identifies the occurrence of data exfiltration (e.g., the record may identify the user, the content, and/or the information). Additionally, or alternatively, an action may include transmitting a notification to another user device (e.g., that is associated with an administrator, a manager, or the like). The notification may provide an indication of the occurrence of data exfiltration and/or include similar information as the record. Additionally, or alternatively, an action may include deleting one or more recent screen captures (e.g., that were captured less than a minute prior, an hour prior, or a day prior) from the user device. Additionally, or alternatively, an action may include updating one or more data access permissions associated with the user device or the user to be more restrictive. Additionally, or alternatively, an action may include locking the user device.

In this way, the user device may provide improved data security with reduced data exfiltration. Accordingly, computing resources that would otherwise be used toward securing sensitive information, monitoring for and detecting data exfiltration, and/or remediating fraud or other malicious activity that is committed using exfiltrated data, among other examples, may be conserved.

As indicated above, FIGS. 1A-1E are provided as an example. Other examples may differ from what is described with regard to FIGS. 1A-1E.

FIG. 2 is a diagram of an example environment 200 in which systems and/or methods described herein may be implemented. As shown in FIG. 2, environment 200 may include a user device 210, a data system 220, and a network 230. Devices of environment 200 may interconnect via wired connections, wireless connections, or a combination of wired and wireless connections.

The user device 210 includes one or more devices capable of receiving, generating, storing, processing, and/or providing information associated with obfuscating information in content presented on a display, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 210 may include one or more CPUs and/or one or more GPUs.

The data system 220 includes one or more devices capable of receiving, generating, storing, processing, providing, and/or routing information associated with obfuscating information in content presented on a display, as described elsewhere herein. For example, in response to a request from the user device, the data system may provide data to the user device 210 that includes sensitive information that should be obfuscated, as described elsewhere herein. The data system 220 may include a communication device and/or a computing device. For example, the data system 220 may include a server, such as an application server, a client server, a web server, a database server, a host server, a proxy server, a virtual server (e.g., executing on computing hardware), or a server in a cloud computing system. In some implementations, the data system 220 includes computing hardware used in a cloud computing environment. In some implementations, the data system 220 includes one or more data sources, such as one or more databases (e.g., that store sensitive information).

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
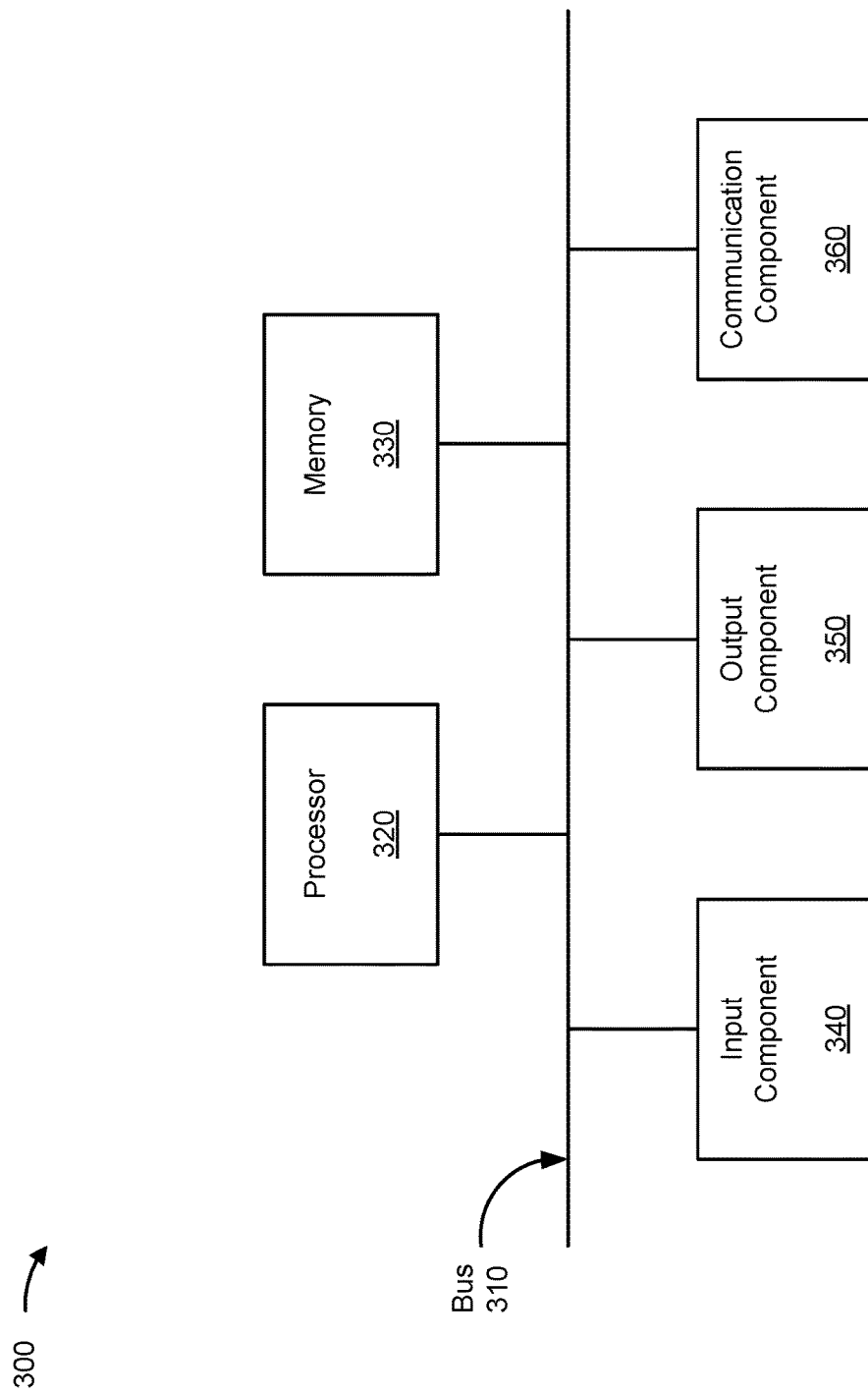
FIG. 3 is a diagram of example components of one or more devices of FIG. 2, in accordance with some embodiments of the present disclosure.

FIG. 3 is a diagram of example components of a device 300, which may correspond to user device 210 and/or data system 220. In some implementations, user device 210 and/or data system 220 includes one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
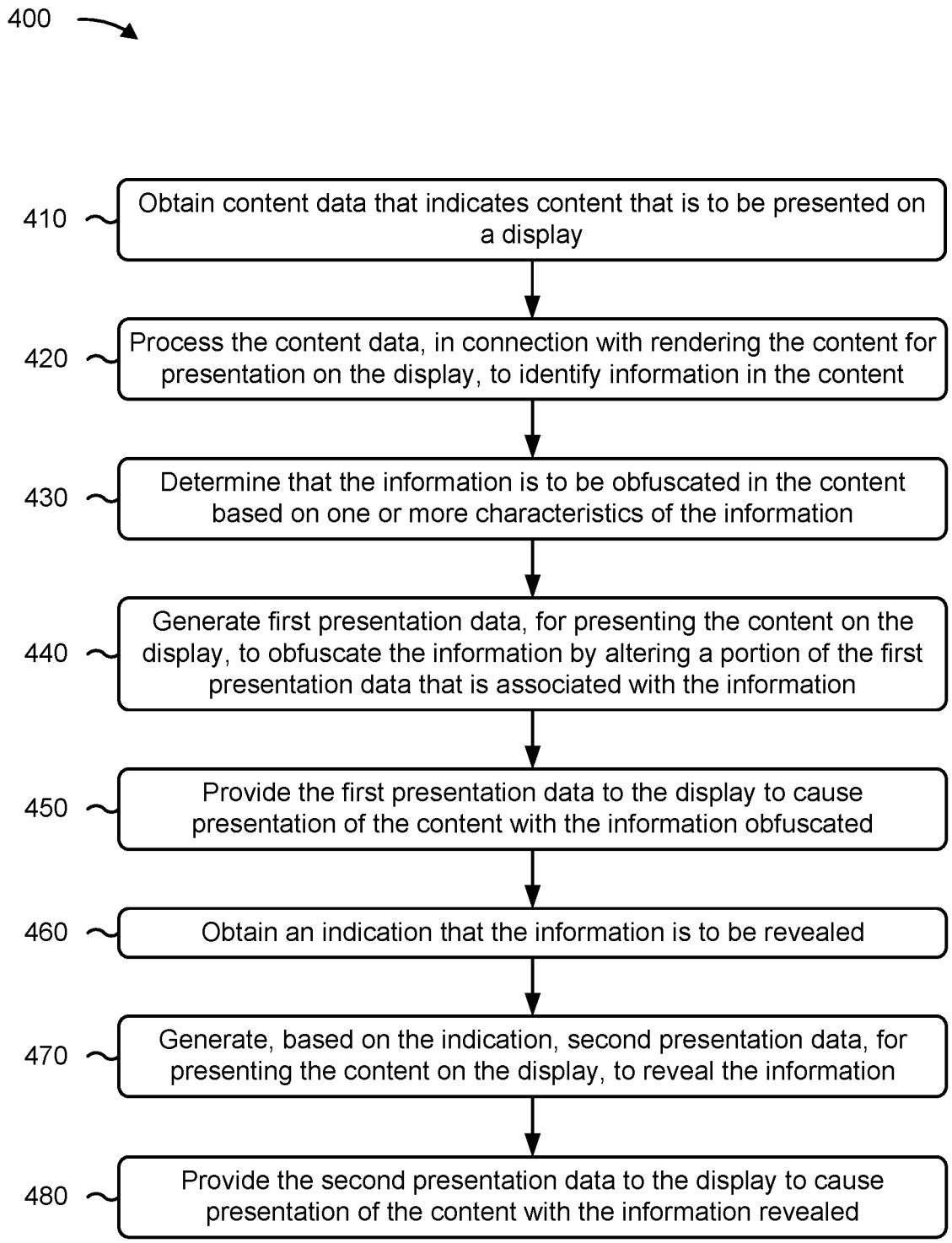
FIG. 4 is a flowchart of an example process relating to obfuscating information in content presented on a display, in accordance with some embodiments of the present disclosure.

FIG. 4 is a flowchart of an example process 400 associated with obfuscating information in content presented on a display. In some implementations, one or more process blocks of FIG. 4 may be performed by the user device 210. In some implementations, one or more process blocks of FIG. 4 may be performed by another device or a group of devices separate from or including the user device 210, such as the data system 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining content data that indicates content that is to be presented on a display (block 410). For example, the user device 210 (e.g., using processor 320, memory 330, and/or communication component 360) may obtain content data that indicates content that is to be presented on a display, as described above in connection with reference number 110 of FIG. 1A. As an example, a GPU of the user device 210 may obtain the content data (e.g., a signal indicating the content data) from a CPU of the user device, and the content indicated by the content data may include any textual, graphical, and/or video content that can be presented on the display in a visually perceptible manner. In some implementations, the content data is in a binary format.

As further shown in FIG. 4, process 400 may include processing the content data, in connection with rendering the content for presentation on the display, to identify information in the content (block 420). For example, the user device 210 (e.g., using processor 320 and/or memory 330) may process the content data, in connection with rendering the content for presentation on the display, to identify information in the content, as described above in connection with reference number 115 of FIG. 1B. As an example, to identify the text, the GPU of the user device 210 may process the content data using information that identifies binary patterns associated with various text and/or using a machine learning model trained to identify text from data in a binary format.

As further shown in FIG. 4, process 400 may include determining that the information is to be obfuscated in the content based on one or more characteristics of the information (block 430). For example, the user device 210 (e.g., using processor 320 and/or memory 330) may determine that the information is to be obfuscated in the content based on one or more characteristics of the information, as described above in connection with reference number 120 of FIG. 1B. As an example, if the information includes a 16-digit sequence of numbers in a format "9999 9999 9999 9999," then the information may be determined to be obfuscated (e.g., because the length and the formatting of the information resembles a credit card number).

As further shown in FIG. 4, process 400 may include generating first presentation data, for presenting the content on the display, to obfuscate the information by altering a portion of the first presentation data that is associated with the information (block 440). For example, the user device 210 (e.g., using processor 320 and/or memory 330) may generate first presentation data, for presenting the content on the display, to obfuscate the information by altering a portion of the first presentation data that is associated with the information, as described above in connection with reference number 125 of FIG. 1C. As an example, the GPU of the user device 210 may render one or more frames for display to alter the portion of the first presentation data, that includes the sequence of numbers "9999 9999 9999 9999," by replacing, omitting, and/or scrambling the portion (e.g., pixel values in the portion) of the first presentation data. For example, the sequence of numbers "9999 9999 9999 9999" may be altered to "################."

As further shown in FIG. 4, process 400 may include providing the first presentation data to the display to cause presentation of the content with the information obfuscated (block 450). For example, the user device 210 (e.g., using processor 320, memory 330, output component 350, and/or communication component 360) may provide the first presentation data to the display to cause presentation of the content with the information obfuscated, as described above in connection with reference number 130 of FIG. 1C. As an example, the GPU of the user device 210 may provide the first presentation data to the display to cause presentation of the content with the information obfuscated. The display may be a component of the user device 210, or the display may be separate from the user device 210 and communicatively connected to the user device 210 by a wired connection or a wireless connection As further shown in FIG. 4, process 400 may include obtaining an indication that the information is to be revealed (block 460). For example, the user device 210 (e.g., using processor 320, memory 330, and/or input component 340) may obtain an indication that the information is to be revealed, as described above in connection with reference number 135 of FIG. 1D. As an example, the CPU of the user device 210 may detect a user interaction (e.g., a tap on the display, a click, a click and keypress combination, or the like) with the portion of the content (e.g., the obfuscated text presented as "################") indicating that the information is to be revealed, and the GPU of the user device 210 may obtain, from the CPU, an indication that the information is to be revealed.

As further shown in FIG. 4, process 400 may include generating, based on the indication, second presentation data, for presenting the content on the display, to reveal the information (block 470). For example, the user device 210 (e.g., using processor 320 and/or memory 330) may generate, based on the indication, second presentation data, for presenting the content on the display, to reveal the information, as described above in connection with reference number 140 of FIG. 1E. As an example, the GPU of the user device 210 may render one or more frames for display to reveal the information (e.g., to reveal the text "9999 9999 9999 9999"). In some implementations, the portion of the first presentation data that is altered to obfuscate the information is unaltered in the second presentation data to reveal the information.

As further shown in FIG. 4, process 400 may include providing the second presentation data to the display to cause presentation of the content with the information revealed (block 480). For example, the user device 210 (e.g., using processor 320 and/or memory 330) may provide the second presentation data to the display to cause presentation of the content with the information revealed, as described above in connection with reference number 145 of FIG. 1E. As an example, the GPU of the user device 210 may provide the second presentation data to the display to cause presentation of the content with the information revealed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for obfuscating information in content that is to be presented on a display, the system comprising:
one or more memories; and
one or more processors, communicatively coupled to the one or more memories, configured to:
 obtain content data that indicates the content, wherein the content data is in a binary format;
 process the content data, in connection with rendering the content for presentation on the display, to identify the information in the content;
 determine that the information is to be obfuscated in the content based on one or more characteristics of the information;
 when rendering first presentation data, for presenting the content on the display, render a portion of the first presentation data to overwrite pixel values that produce the information with pixel values that produce a redaction block;
 provide the first presentation data to the display to cause presentation of the content with the information obfuscated;
 generate second presentation data, for presenting the content on the display, to reveal the information, wherein the portion of the first presentation data is unaltered in the second presentation data to reveal the information;
 determine that a frequency at which obfuscated information of the content is revealed satisfies a threshold; and
 generate a record that identifies an occurrence of data theft based on determining that the frequency satisfies the threshold, wherein the record identifies a user and the information.

2. The system of claim 1, wherein the one or more processors, to generate the first presentation data to obfuscate the information, are configured to:
generate the first presentation data such that a single value or random values are assigned to pixels associated with the portion of the first presentation data.

3. The system of claim 1, wherein the one or more processors, to render the portion of the first presentation data, are configured to:
generate the first presentation data such that values are rearranged for pixels associated with the portion of the first presentation data.

4. The system of claim 1, wherein the one or more processors are further configured to:
store the information in the one or more memories; and
obtain the information from the one or more memories responsive to obtaining an indication that the information is to be revealed.

5. The system of claim 4, wherein the indication that the information is to be revealed is responsive to a user interaction with a portion of the content associated with the portion of the first presentation data.

6. The system of claim 1, wherein the one or more characteristics of the information include at least one of a type of the information, a length of the information, or a formatting of the information.

7. The system of claim 1, wherein the one or more processors are further configured to:
perform one or more actions to mitigate data exfiltration based on determining that the frequency satisfies the threshold.

8. The system of claim 1, wherein the one or more processors are one or more graphics processing units.

9. A method of obfuscating information in content that is to be presented on a display, comprising:
obtaining, by a device, content data that indicates the content, wherein the content data is in a binary format;
processing, by the device, the content data, in connection with rendering the content for presentation on the display, to identify the information in the content;
determining, by the device, that the information is to be obfuscated in the content based on one or more characteristics of the information;
when rendering, by the device, presentation data, for presenting the content on the display, rendering a portion of the presentation data to overwrite pixel values that produce the information with pixel values that produce a redaction block;
providing, by the device, the presentation data to the display to cause presentation of the content with the information obfuscated;
determining that a frequency at which obfuscated information of the content is revealed satisfies a threshold; and generating a record that identifies an occurrence of data theft based on determining that the frequency satisfies the threshold.

10. The method of claim 9, further comprising:
generating, responsive to a user interaction indicating that the information is to be revealed, different presentation data, for presenting the content on the display, to reveal the information; and
providing the different presentation data to the display to cause presentation of the content with the information revealed.

11. The method of claim 9, wherein the one or more characteristics of the information include at least one of a type of the information, a length of the information, or a formatting of the information.

12. The method of claim 9, wherein processing the content data identifies the information and one or more words in the content, and
wherein the information is determined to be obfuscated further based on the one or more words.

13. The method of claim 9, wherein processing the content data identifies the information and other text in the content, and
wherein the method further comprises:
determining a classification of the content based on at least one of the information and the other text.

14. The method of claim 13, wherein the one or more characteristics of the information are one or more first characteristics if the classification of the content is a first classification, and the one or more characteristics of the information are one or more second characteristics if the classification of the content is a second classification.

15. The method of claim 9, further comprising:
performing one or more actions to mitigate data exfiltration based on determining that the frequency at which the obfuscated information is revealed satisfies the threshold, wherein determining that the frequency at which the obfuscated information of the content is revealed satisfies the threshold comprises determining that a quantity of screen captures of the content satisfies the threshold.

16. A non-transitory computer-readable medium storing a set of instructions for obfuscating information in content that is to be presented on a display, the set of instructions comprising:
one or more instructions that, when executed by one or more processors of a device, cause the device to:
obtain content data that indicates the content, wherein the content data is in a binary format;
process the content data, in connection with rendering the content for presentation on the display, to identify the information in the content;
determine that the information is to be obfuscated in the content;
when rendering presentation data, for presenting the content on the display, render a portion of the presentation data to overwrite pixel values that produce the information with pixel values that produce a redaction block;
provide the presentation data to the display to cause presentation of the content with the information obfuscated;
determine that a frequency at which obfuscated information of the content is revealed satisfies a threshold; and
generate a record that identifies an occurrence of data theft based on determining that the frequency satisfies the threshold, wherein the record identifies a user and the information.

17. The non-transitory computer-readable medium of claim 16, wherein the presentation data indicates values for pixels of the display.

18. The non-transitory computer-readable medium of claim 16, wherein the one or more instructions, that cause the device to render the presentation data, cause the device to:
generate the presentation data to obfuscate the information by replacing, omitting, or scrambling the portion of the presentation data.

19. The non-transitory computer-readable medium of claim 16, wherein the one or more instructions, when executed by the one or more processors, further cause the device to:
detect a user interaction with a portion of the content associated with the portion of the presentation data;
determine that the user interaction indicates that the information is to be revealed;
generate different presentation data, for presenting the content on the display, to reveal the information; and
provide the different presentation data to the display to cause presentation of the content with the information revealed.

20. The system of claim 1, wherein the one or more processors comprise a first processing unit,
and wherein the one or more processors, to obtain the content data, are configured to:
obtain, by the first processing unit and from a second processing unit, the content data.

* * * * *